United States Patent Office 3,093,691
Patented June 11, 1963

3,093,691
PREPARATION OF ALCOHOLS FROM ALUMINUM TRIALKYLS
Gifford G. McClaflin and Mark T. Atwood, Ponca City, Okla., assignors to Continental Oil Company, Ponca City, Okla., a corporation of Delaware
No Drawing. Filed Nov. 5, 1959, Ser. No. 851,023
2 Claims. (Cl. 260—638)

This invention relates to a novel method of preparing aliphatic alcohols. More particularly the present invention relates to a two stage process of preparing such alcohols which comprises reacting a trialkylaluminum compound in the first stage with an aliphatic aldehyde and then in the second stage hydrolyzing the resultant product to form the desired alcohol.

Various methods have been proposed for the production of alcohols involving processes other than fermentation methods or the destructive distillation of wood. In one proposed method a high molecular weight ketone is reacted with sodium or potassium acetylide to form the sodium or potassium derivatives of a substituted ethinyl carbinol which product is then hydrolyzed to the ethinyl carbinol. In another method an aldehyde is reduced to the corresponding alcohol employing a secondary metallic alkoxide as the reducing agent. In another method it has been proposed that alcohols can be produced by a process involving the reaction of formaldehyde with a metal alkyl compound, such as a lithium, magnesium, or sodium alkyl compound. None of these proposed methods have been entirely satisfactory. In the process using sodium or potassium acetylide that compound is prepared by reacting acetylene wtih metallic sodium or potassium. Since metallic sodium and potassium are very reactive, they must be handled with extreme care.

In the process involving the reduction of an aldehyde the alcohol will have the same number of carbon atoms as the aldehyde. Furthermore, the reducing agent used is an alkoxide which can be considered an alcohol precursor. In the last process described above metal alkyl compounds are employed which are expensive, difficult to work with, and are not readily available.

It is, therefore, a principal object of our invention to provide a process for the production of aliphatic alcohols which obviates the disadvantages of the prior art processes.

It is another object of the present invention to provide an improved process for the production of aliphatic alcohols.

Another object of this invention is to provide an economical and direct process for the manufacture of aliphatic alcohols involving a minimum of process steps and using moderate reaction conditions.

Further objects and advantages will become apparent from the following description.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention may be described as a process for preparing an aliphatic alcohol by reacting a trialkylaluminum compound with an aliphatic aldehyde and then hydrolyzing the resultant product to form the desired alcohol.

Before proceeding with specific examples illustrating our invention, it may be well to indicate in general the nature and amounts of the materials required in the process.

Suitable trialkylaluminum compounds include such compounds wherein the carbon content of the alkyl radicals varies from 1 to 20 or even more. Although theoretically there is no limit to the number of carbons in the alkyl radical that can be used, we generally prefer to employ a trialkylaluminum compound wherein the carbon content of alkyl radicals varies from 2 to 12. Obviously the alkyl radicals of the trialkylaluminum compound may be the same or different. As a rule a compound wherein the alkyl radicals are the same is desired as the use of such a compound produces one alcohol. If on the other hand a compound is used wherein the alkyl radicals are different a mixture of alcohols is formed. A specific compound that we have used very successfully in our process is triethylaluminum. Methods for the preparation of this particular compound and other trialkylaluminum compounds are described in the literature and forms no part of the present invention. In this regard reference is made to U.S. Patents 2,781,410; 2,787,626; 2,826,598; 2,835,689; and British Patent 808,055.

Suitable aliphatic aldehydes include the lower molecular weight compounds. We prefer to use formaldehyde because it is both economical in price and is available in large quantities. In addition it is easily handled and can be used as the pure compound or as a polymer. Generally we prefer to employ the polymer as it is the easiest to handle and improved yields of the desired alcohol are obtained using that product.

The proportions of the reactants, namely, the trialkylaluminum compound and the aldehyde may be varied over a wide range. Theoretically in our process three moles of the aldehyde and three moles of water are used per mole of the trialkylaluminum compound. This may be illustrated by the equation given below in which triethylaluminum is reacted with formaldehyde and then hydrolyzed to produce normal propyl alcohol.

$$Al(C_2H_5)_3 + 3HCHO + 3H_2O \rightarrow 3C_3H_7OH + Al(OH)_3$$

Although as pointed out above three moles each of formaldehyde or other aldehyde and water are required per mole of the trialkylaluminum compound, we prefer in practice to employ an excess of both the aldehyde and water. Any unreacted aldehyde can be easily recovered from the reaction mass, consequently we generally employ an amount of aldehyde which may be two to three times the theoretical amount required.

Instead of using water as such we have found it preferable to employ an aqueous solution of a mineral acid such as 25 percent hydrochloric acid. Other aqueous solutions of mineral acids and of different concentrations may, of course, be used.

In view of the fact that the particular reactants used may be selected from a large list and since the best operating temperature depends largely upon the specific reactants used, the temperature employed may vary from −50 to about 150° C. Generally, we prefer to operate within a temperature range of 30 to 100° C. Somewhat more specifically as a rule we prefer to operate at the reflux temperature of the mixture. It is to be understood, however, that higher or lower temperatures may be used with a resultant increase or decrease in the reaction rate in accordance with the general law of chemical reactions.

In order to disclose the nature of the present invention still more clearly, the following illustrative examples will be given in which "parts by weight" bear the same relation to "parts by volume" as do grams to cubic centimeters.

*Example 1*

32 parts by weight of paraformaldehyde was added to a reaction vessel which was equipped with an agitator.

The vessel was then flushed with nitrogen and then 50 parts of anhydrous ether added. While the contents of the flask were stirred 40 parts of triethylaluminum was slowly added to the vessel. The mixture was heated for a period of two hours at reflux temperature after which period the reaction product was hydrolyzed with an aqueous 25 percent hydrochloric acid solution. The normal propyl alcohol formed was recovered by distillation in a fair yield based on the triethylaluminum.

*Example 2*

The procedure of Example 1 was repeated with the exception that 32 parts of trioxane was substituted for the paraformaldehyde used in Example 1. A yield of normal propyl alcohol was obtained.

*Example 3*

The procedure of Example 2 was repeated with the exception that 25 parts of trimethylaluminum was substituted for the 40 parts of triethylaluminum used in Example 2. A yield of ethyl alcohol was obtained.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A process for the manufacture of a primary aliphatic alcohol which comprises reacting trioxane with a trialkylaluminum compound of the type $(R-CH_2)_3Al$ in which R is selected from the group consisting of primary saturated aliphatic hydrocarbon radicals having from 1 to 19 carbon atoms and hydrogen at a temperature of 30 to 100° C., to yield a reaction product, hydrolyzing of said reaction product and recovering from the hydrolysis product the corresponding alcohol of the type $R-CH_2-CH_2-OH$.

2. The process according to claim 1 in which the trialkylaluminum compound is triethylaluminum.

References Cited in the file of this patent

UNITED STATES PATENTS

| | | |
|---|---|---|
| 1,410,223 | Schumann et al. | Mar. 21, 1922 |
| 2,699,457 | Ziegler et al. | Jan. 11, 1955 |

FOREIGN PATENTS

| | | |
|---|---|---|
| 803,178 | Great Britain | Oct. 22, 1958 |

OTHER REFERENCES

Meerwein et al.: Chemical Abstracts, (1937), 31, 655–6.

Meerwein et al.: J. Prakt. Chem., 147, pp. 226–50 (1936).

Rochow et al.: The Chemistry of Organometallic Compounds, pp. 278, 288–291 (1957). (Copies of references available in Sci. Lib.)